Oct. 31, 1939.  A. S. KROTZ  2,177,893
VEHICLE
Filed Feb. 23, 1938  2 Sheets-Sheet 1
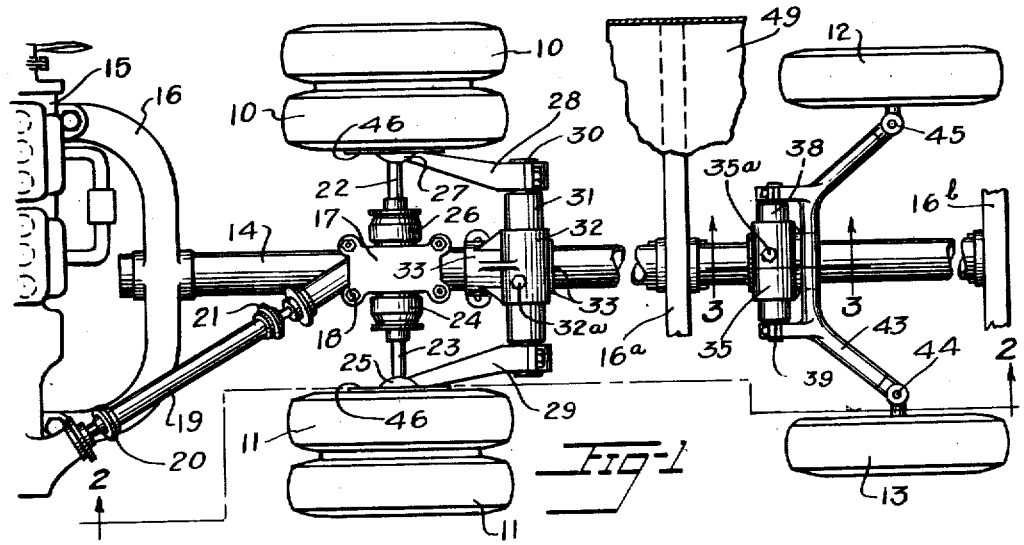
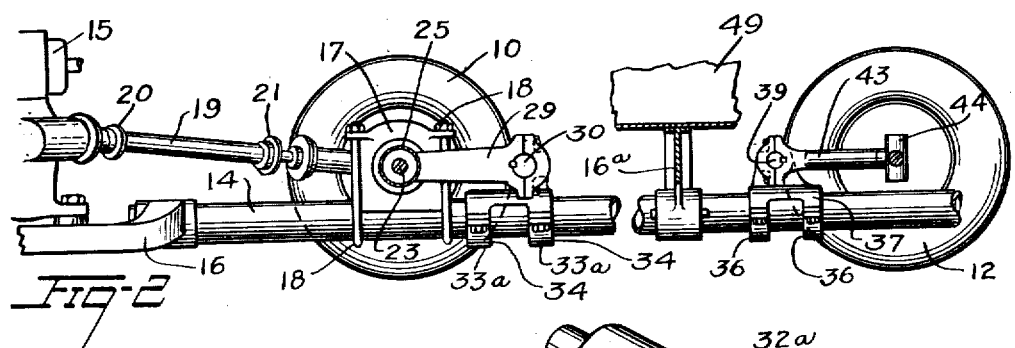
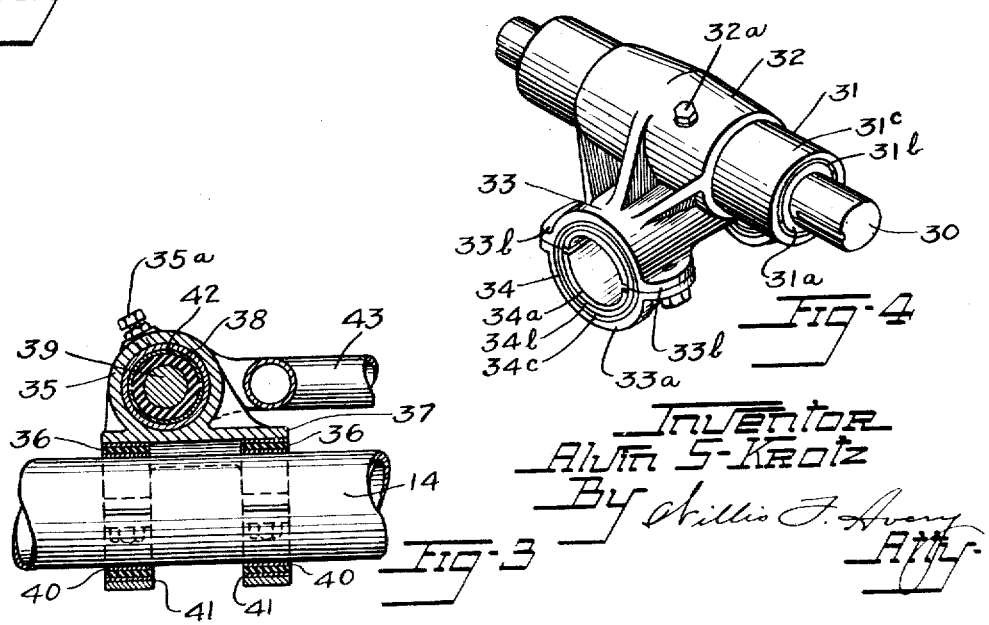
Inventor
Alvin S. Krotz
By Willis F. Avery
Atty.

Oct. 31, 1939.  A. S. KROTZ  2,177,893
VEHICLE
Filed Feb. 23, 1938  2 Sheets-Sheet 2
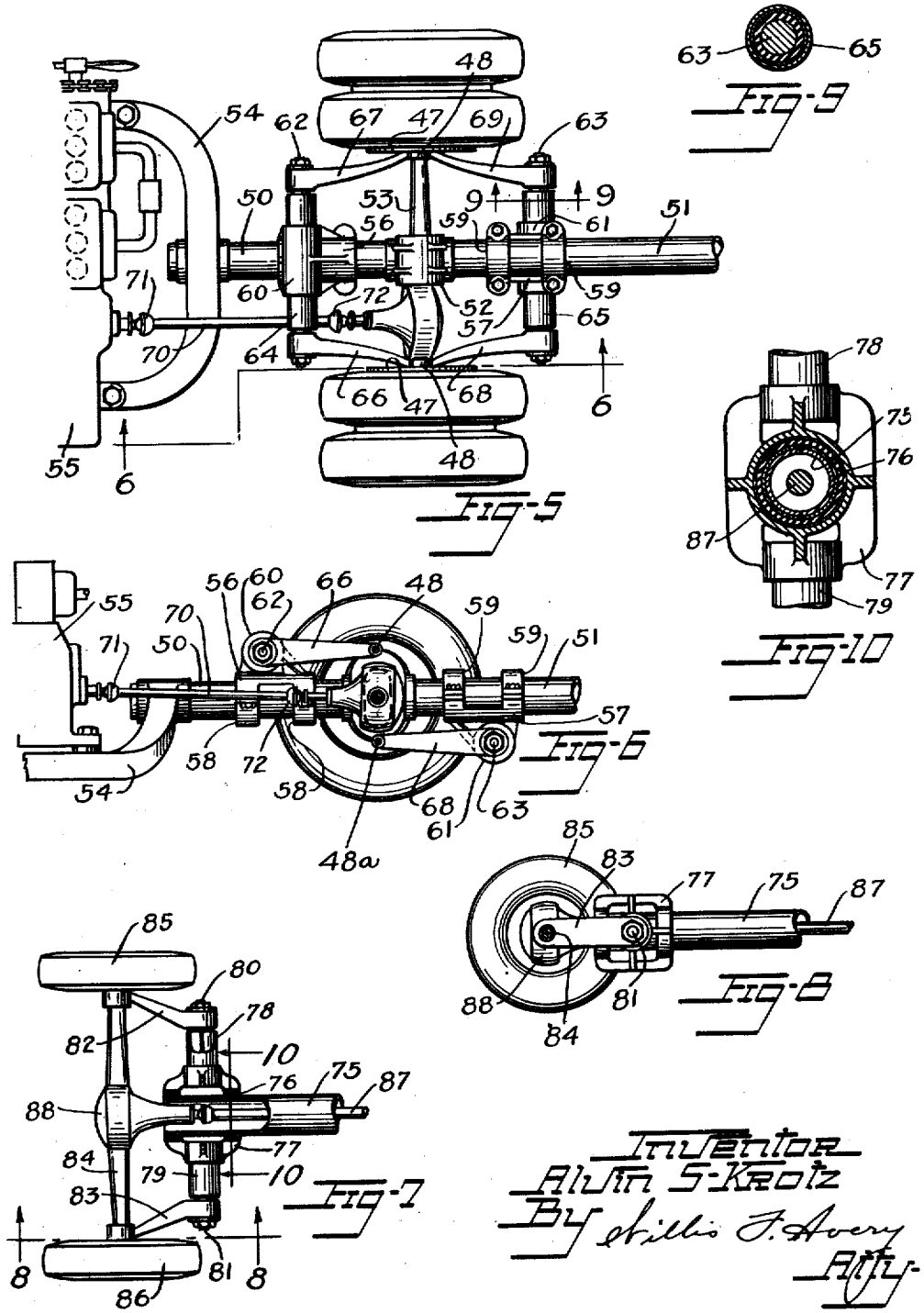

Patented Oct. 31, 1939

2,177,893

UNITED STATES PATENT OFFICE 2,177,893

VEHICLE

Alvin S. Krotz, Akron, Ohio, assignor to The B. F. Goodrich Company, New York, N. Y., a corporation of New York Application February 23, 1938, Serial No. 192,013

16 Claims. (Cl. 267—21)

This invention relates to vehicles, and especially to vehicle suspensions, and it is applicable to many types of vehicles, including automotive vehicles of the truck, bus, and passenger car types.

In prior constructions the spring suspensions have been such, especially where the unsprung mass has included a pair of wheels rigidly interconnected by an axle housing or other structure, that springing movements of two distinct types have been elastically controlled by the same springs. These two types of movement are vertical movement of one with relation to the other of the sprung and unsprung masses, and lateral tilting movement of one mass with relation to the other, these movements occurring as a result of road irregularities or forces inducing body sway or both.

By imposing the two functions of controlling these two types of movement upon the same spring undesirable limitations of design and performance result. I find that in many cases it is desirable that the two cushioning functions be controlled independently, but the prior constructions have not provided effectively for this so far as I am aware.

The chief objects of this invention are to provide an improved suspension; to provide independence of means for resiliently controlling the two types of cushioned movement above discussed so that these two cushioning functions will be divorced and provided for independently.

Further objects are to provide an improved construction permitting controlled vertical movement of one of the sprung and unsprung masses with relation to the other, especially where the unsprung mass comprises a pair of wheels and a rigid interconnection between such wheels; to provide for restricting the vertical movements of the tilting type to swinging about a single axis; to provide effective cushioning of such movements, and to provide a construction that is conveniently adaptable to positioning the single axis referred to at any desired level in the vehicle within a wide range of discretion of the vehicle designer and even to position such axis at or near the height of the center of gravity of the sprung mass of the vehicle, if that be desired.

A still further object is to provide a construction in which upward lunging of the rear portion of the vehicle and downward lunging of the front portion of the vehicle under the forces of deceleration may be eliminated or substantially reduced.

Related objects are to provide compactness and strength of structure and convenience of assembly.

These and other objects will be apparent from the following description and the accompanying drawings.

Of the drawings:

Fig. 1 is a plan view of the under structure of a vehicle of the motor, truck or bus type constructed according to and embodying the invention, parts being broken away and sectioned.

Fig. 2 is a sectional elevation taken on line 2—2 of Fig. 1.

Fig. 3 is a detail sectional view of the embodiments of Fig. 1, taken along line 3—3 thereof, parts being broken away.

Fig. 4 is a perspective view of the torsion bushing assembly for the rear wheels.

Fig. 5 is a plan view of a modified form of vehicle under structure embodying the invention, parts being broken away.

Fig. 6 is a sectional view taken along line 6—6 of Fig. 5, parts being broken away.

Fig. 7 is a plan view of a further modified form of vehicle under structure embodying the invention, suitable especially for passenger car construction, parts being broken away.

Fig. 8 is a sectional elevation thereof taken along line 8—8 of Fig. 7.

Fig. 9 is a sectional view taken along line 9—9 of Fig. 5.

Fig. 10 is a detail sectional view taken along line 10—10 of Fig. 7.

Referring to the drawings, in the embodiment illustrated in Figs. 1 to 4, the numerals 10, 10, 11, 11 designate a pair of rear wheels of the dual tire type, and the numerals 12, 13 a pair of front wheels of an automotive vehicle such as a truck or passenger bus. The frame structure of the vehicle may be of any suitable construction, and, in this illustrative embodiment it comprises a single longitudinal frame member 14, which may be of tubular construction. The vehicle body, a portion of which is indicated at 49 may be mounted directly upon this frame member by any suitable brackets 16, 16a and 16b, the body being provided with suitable clearances for the under structure and wheel movements.

The engine or power plant 15 may be supported directly on the frame end, as shown, may be mounted to the rear of the rear wheels as by means of the bracket 16 in the form of a supporting yoke secured to the frame member 14. A differential gear case 17 is mounted upon the frame, for example, as by U-bolts 18 and contains suitable differential mechanism for driving the rear wheels. A drive shaft 19 drives the differential from the engine, a pair of universal joints 20, 21 being provided in the drive shaft to taken up deflection between the engine and the differential. Each axle shaft 22, 23 extending from the differential for the purpose of driving the wheels is provided with a pair of universal joints 24, 25 and 26, 27 so as to permit the wheels to rise and fall with respect to the frame of the vehicle.

The rear wheels are mounted on arms 28, 29 fixed to opposite ends of a shaft 30 extending transversely of the vehicle, the arms preferably being fixed to the brake flanges 46, 46 or to axle housings. These arms and shaft provide a rigid transverse interconnection for the wheels. Shaft 30 with its connected wheels is supported by a resilient torsion element to provide springing for the relative vertical movements of the unsprung and sprung masses, the vertical movements of the wheels together being thus cushioned. The torsional springing preferably is provided by a rubber torsion bushing assembly 31 mounted cross-wise of the vehicle in a housing 32 through which the shaft 30 extends.

The transverse torsion bushing assembly 31 preferably comprises an annulus 31a of rubber, which may be vulcanized directly upon the shaft 30, and a circumferentially discontinuous sleeve structure 31b, which may be in the form of a pair of semicircular sleeve parts to which the rubber is vulcanized, this assembly being mounted within a continuous sleeve 31c with the discontinuous sleeve structure and rubber held pressed radially toward the shaft 30. While the sleeve 31c may be non-rotatively mounted in the housing 32 by a force fit or a splined connection it is preferred that this mounting be such that the bushing may be rotatively adjusted in the housing for the purpose of regulating the normal vertical positions of the wheels with respect to the body. This may be effected by means of a set screw 32a extending through the wall of the housing and engaging the surface of the sleeve 31c, or by any other suitable means.

The housing 32 is in turn mounted upon a housing 33 containing a rubber torsion bushing assembly 34 which may conveniently be mounted about the frame member 14, although it may be mounted above or below the frame member, if desired, this torsion bushing assembly being effective to cushion relative tilting movements of the unsprung and sprung masses as when the interconnected wheels are laterally tilted or the body sways, or both.

The longitudinal torsion bushing assembly 34 as illustrated comprises two similar portions which are spaced apart longitudinally to obtain a secure purchase against the forces transmitted to it by the torsional springing tending to tip it in the longitudinal direction of the vehicle. As these portions may be of similar construction, only one, the rear-most one, need be described. For convenience of assembly, it is divided and held clamped onto the tubular frame member 14 by means of a cap 33a bolted to the upper part of the housing 33 at laterally projecting flanges 33b, 33b. The divided bushing comprises inner and outer sleeves 34a and 34c, between which is interposed, preferably in vulcanized adhesion with them, a rubber body 34b, all in two semi-circular parts of such radial dimensions that these parts may be clamped upon the tubular frame member 14, with the rubber held radially compressed.

As the two housings 32 and 33 are to move together, they may be made as an integral unit, for example by welding two sleeves together in the crosswise relation or by making the unit as an integral casting as shown most clearly in Fig. 4.

The rubber torsion bushings may be vulcanized to the metal parts or held under radial compression, or both, so as to be in non-slipping engagement with the rigid parts. Any suitable rubber composition may be used preferably comprising natural rubber although suitable so-called synthetic types of rubber and other rubber-like materials possessing suitable properties, especially resilience and strength, may be used.

The construction and arrangement is such that the unitary housing 32, 33 may be rotated about the frame member 14 on an axis longitudinal of the vehicle against the resilient resistance of the rubber bushing 34b, thereby cushioning relative tilting of the unsprung and sprung masses and permitting cushioned vertical movement of one wheel with relation to the other to accommodate inequalities of the road, while the shaft 30 may rotate on an axis cross-wise of the vehicle against the resilient resistance of the rubber bushing 31a to cushion relative vertical movements of the unsprung and sprung masses and permit rising and falling of the wheels in unison.

The usual wheel brakes are preferably provided at the wheels, the flanges of which are indicated at 46, 46. By the mounting of the transverse torsion bushing assembly 31 with its axis forward of the axis of the rear wheels as shown, and the supporting arms rigid with the brake flanges of the wheels, the forces of braking on the rear wheels are effective to exert a downward pressure on the frame at the bushing assembly, which acts to counterbalance the tendency of the rear portion of the vehicle body to lunge upward as a result of the forward transfer of load under the decelerating force, so that the upward lunging of the rear portion of the vehicle is substantially reduced or prevented.

Springing of the front wheels 12, 12 is provided for by a housing 37 mounted on portions of a rubber torsion bushing assembly 36 about the frame member 14, the portions preferably being longitudinally spaced apart for stability in the manner of the rear bushing assembly 34, although a single bushing of suitable length may be provided, if desired. A rubber bushing assembly 38 is mounted cross-wise of the vehicle in a housing 35 and engages a shaft 39.

As in the construction of the bushing 34 for the rear wheels hereinabove described the two portions of the bushing assembly 36 may be formed in halves for convenience in mounting them upon the frame member and each half is preferably lined on its inner and outer faces with semi-circular metal sleeve members 40, 41 which may be doweled or keyed to the housing and frame member, although the frictional fit may be utilized to hold the parts in place, the assembly preferably being such that the rubber is held radially compressed. The rubber of the transverse bushing assembly 38 is preferably vulcanized to the shaft 39 and provided on its outside with a split metal sleeve structure 42 in two semi-circular parts to provide circumferential discontinuity, the shaft with its rubber and sleeve structure being forced into the housing to hold the rubber radially compressed. If desired, means such as the set screw 35a may be provided to hold the sleeve in adjusted position in the housing for regulating the height of the front wheels with respect to the body.

A fork 43 fixed to the shaft 39 is connected with the wheels 12, 13 through joints 44, 45 for steering movement of the wheels through any suitable steering mechanism. Except for the steering movement this assembly provides a rigid transverse interconnection for the wheels. The arrangement is such that the vertical and tilting movements of the sprung and unsprung masses are independently cushioned. The wheels 12, 13 may rise or fall in unison with respect to the frame of the vehicle, being torsionally sprung by means of the transverse torsion bushing assembly 38. These wheels may also rise and fall one with relation to the other about the longitudinal axis of the torsion bushing assembly 36 to compensate for irregularities in the road, all these movements being resisted resiliently by the rubber of the bushing assemblies.

The longitudinally disposed torsion bushing at the rear wheels may be mounted with its axis horizontal; or it may be mounted at some angularity to the horizontal, preferably sloping downward in the forward direction for the purpose of causing corrective forces to develop to increase the directional stability of the vehicle as when it rounds turns, under which conditions it is desirable that the vehicle have a tendency to "under-steer" the turn rather than "over-steer it".

Shock absorber or dampening of the movements is provided by the hysteresis action of the rubber of each of the torsion bushings. Additional dampening may be provided by the addition of suitable shock absorber or other dampening devices (not shown), if desired.

In the embodiment of the invention shown in Figs. 5, 6, and 9, the supported load on the rear wheels is divided between two torsion bushing assemblies, which construction is suitable especially for every heavy vehicles. In this form of the invention a central frame member comprises tubular members 50, 51 in axial alignment with each other and secured together by a gap-spanning structure 52 through which an axle housing 53 extends, there being a vertically elongate clearance opening in the structure 52 about the axle housing. A yoke 54 fixed to frame member 50 supports the motor 55. A housing 56 rearward of the axle housing and a housing 57 forward thereof are resiliently supported upon the frame members 50 and 51 respectively by rubber torsion bushing assemblies 58 and 59, which may be similar in construction to the assemblies 34 and 36 of the embodiment of Figs. 1 to 4, and are integral with transverse housings 60 and 61 wherein cross shafts 62, 63 are supported by rubber torsion bushing assemblies 64, 65 for springing the wheels for vertical movement together. A pair of arms 66, 67 are fixed to shaft 62, the arms extending forwardly thereof, and are pivotally mounted at 48, 48 to the axle housing 53 above its center, preferably directly to the brake flanges 47, 47. A similar pair of arms 68, 69 are fixed to shaft 63, the arms extending rearwardly thereof, and are pivotally mounted on the axle housing below its center at 48ª, 48ª, the arrangement being such that vertical movement of the axle housing with respect to the frame is permitted and resiliently resisted by the torsion bushing assemblies 64, 65 for cushioning the vertical movement of the wheels at the two sides of the vehicle together, and lateral rocking of the axle housing with respect to the frame member 51 when there is a vertical movement of the wheels at the two sides of the vehicle with relation to one another is resiliently resisted by the torsion bushing assemblies 58 and 59.

In this construction also the tendency of the rear portion of the vehicle to lunge upward on deceleration of the vehicle is resisted by counterforces at the mountings on the frame as a result of the consequent tendency of the brake flange of the wheel to be moved counter to the braking force. This effect may be increased or decreased as by changing the positions of the pivots 48, 48, 48ª, 48ª, with relation to the shafts 62, 63 and the angular dispositions of the arms 66, 67, 68 and 69, numerous variations of this being conveniently possible.

Also, the longitudinally extending bushing assemblies 58 and 59 may be disposed with their axes horizontal as in the illustrative embodiment, or with these axes canted downward in the forward direction to increase the stability of the vehicle when rounding turns by the development of corrosive forces, or in any other desired manner.

A drive shaft 70 drives the axle through a conventional differential gearing located in the axle housing, universal joints 71, 72 being provided to take care of deflection.

In the modification illustrated in Figs. 7, 8, and 10, which is suitable especially for passenger car use, a tubular frame member 75, extending lengthwise of the vehicle is surrounded at its rear portion by a rubber torsion bushing assembly 76, on which is mounted a housing 77 having aligned lateral bores in which rubber torsion bushing assemblies 78, 79 are retained. These bushing assemblies preferably are constructed and mounted under radial compression in the manner of the assemblies of the embodiments hereinabove described. A pair of shafts 80, 81 are retained within the bushings 78 and 79, and a pair of arms 82, 83, one fixed to the outer end of each shaft are rigidly attached to the ends of an axle housing 84. Wheels 85, 86, are fixed to axle shafts which are driven by differential gearing in the housing 88. A drive shaft 87 extends from the power unit through the frame member 75 to drive the differential gearing.

The construction and arrangement is such that the two types of relative vertical movement of the sprung and unsprung masses are cushioned independently as in the embodiments hereinbefore described. The axially divided transverse bushing permits a convenient arrangement of the two crossing axes in intersecting relation for economy of space. In this construction, as in the embodiment of Fig. 1, the wheel supporting arms are rigid with the brake flanges and are effective to exert a downward pressure on the frame by brake reaction when the rear portion of the body tends to lunge upward on deceleration of the vehicle.

While in the embodiments illustrated in the drawings the longitudinally extending torsion bushing is disposed with its axle coincident with the axis of tubular frame member, it will be understood that this bushing may be disposed above or below the frame member, if desired, the construction making it conveniently feasible to dispose this bushing with its axis at any desired level within a wide range at the discretion of the vehicle designer, and even at or near the height of the center of gravity of the sprung mass of the vehicle in cases where it is preferred. Further, the axis of this longitudinally extending bushing and the axis of the crosswise bushing may be disposed at levels close together coincident or widely separated as desired. Also the longitudinal bushing may be disposed at an angle to the horizontal for corrective purposes, as hereinbefore described.

These and other variations may be made without departing from the scope of the invention as it is defined in the following claims.

I claim:

1. A vehicle comprising an unsprung mass and a sprung mass, springing means for cushioning bodily vertical movement only of one of said masses with relation to the other substantially without cushioning relative lateral tilting movement of said masses, and additional springing means for cushioning lateral tilting movement of one of said masses with relation to the other.

2. A vehicle comprising an unsprung mass including a pair of wheels having a rigid interconnection compelling such wheel to partake of tilting and vertical movements of the other wheel, a sprung mass, springing means for cushioning bodily vertical movement of one of said masses with relation to the other substantially without cushioning relative lateral tilting of said masses, and additional springing means for cushioning tilting movement of one of said masses with relation to the other.

3. A vehicle comprising an unsprung mass including a pair of wheels having a rigid interconnection compelling such wheel to partake of tilting and vertical movements of the other wheel, a sprung mass, springing means for cushioning bodily vertical movement of one of said masses with relation to the other substantially without cushioning relative lateral tilting of said masses, and additional springing means for cushioning tilting movement of one of said masses with relation to the other, the second said springing means restraining the tilting to movement about a single axis.

4. A vehicle comprising an unsprung mass and a sprung mass, springing means comprising a rubber torsion element for cushioning vertical movement of one of said masses with relation to the other, and additional springing means comprising a rubber torsion element for cushioning tilting movement of one of said masses with relation to the other.

5. A vehicle comprising an unsprung mass and a sprung mass, springing means for cushioning bodily vertical movement only of one of said masses with relation to the other substantially without cushioning relative lateral tilting of said masses and additional springing means for cushioning tilting movement only of one of said masses with relation to the other substantially without cushioning relative bodily vertical movement of said masses.

6. A vehicle comprising an unsprung mass and a sprung mass, springing means for cushioning vertical movement of one of said masses with relation to the other, and additional springing means for cushioning tilting movement of one of said masses with relation to the other, said springing means comprising a pair of rubber torsion bushing assemblies mounted with their axes in crossing relation.

7. A vehicle as defined in claim 6 in which the said rubber bushing assemblies are mounted in their crossed relation within a unitary housing.

8. A vehicle comprising a body, a pair of wheels, wheel supporting arms, a structure rigidly interconnecting the arms, and a torsion element associated with such structure for resiliently supporting the wheels, and springing means cushioning tilting movement of the interconnected wheels with relation to the body.

9. A vehicle comprising a body, a pair of wheels disposed at opposite sides of the longitudinal axis thereof, an interconnecting axle housing assembly, driving means for the wheels, springing means comprising a torsion element for cushioning bodily vertical movements of the wheels together substantially without cushioning tilting movement of the wheels with respect to the body, and additional springing means cushioning lateral tilting of the wheels and axle housing assembly.

10. A vehicle as defined in claim 9 in which the lateral tilting of the wheels and axle housing assembly is substantially restrained by the second said springing means to movement about a single axis.

11. A vehicle comprising an unsprung mass comprising a pair of wheels, a sprung mass, springing means comprising a torsion element for cushioning vertical movement of one of said masses with relation to the other, said torsion element being so disposed with relation to the wheels that brake reaction is effective to resist the tendency of the rear portion of the sprung mass to rise as a result of load transfer on deceleration, and additional torsional springing means associated with the first said springing means for cushioning lateral tilting movement of one of said masses with relation to the other.

12. A vehicle comprising a body, a pair of rear wheel assemblies disposed at opposite sides of the longitudinal axis thereof, torsional springing means, wheel-supporting arms pivoted to the wheel assemblies and secured to said torsional springing means in a manner providing a rigid interconnection between the wheels, and second torsional springing means, wheel supporting arms pivoted to the wheel assemblies and secured to said second torsional spring means, the construction and arrangement being such that brake reaction is effective to resist the tendency of the rear portion of the vehicle to rise as a result of load transfer on deceleration.

13. A vehicle as defined in claim 12 comprising additional torsional springing means associated with each of said springing means for cushioning lateral tilting movement of the interconnected wheels with relation to the body.

14. A vehicle comprising an unsprung mass comprising a pair of rear wheels, a sprung mass, springing means including a torsion element for cushioning lateral tilting movement of one of said masses with relation to the other about the axis of said torsion element, said torsion element being disposed with its axis extending longitudinally of the vehicle and sloping downward slightly in the forward direction for the purpose of modifying the direction of travel of said wheels to increase the directional stability of the vehicle under a force tending to produce said tilting movement.

15. A vehicle comprising an unsprung mass comprising a pair of wheels, a sprung mass, springing means including a torsion element for cushioning lateral tilting movement of one of said masses with relation to the other about the axis of said torsion element, said torsion element being disposed with its axis extending longitudinally of the vehicle and sloping at an angle to the horizontal for the purpose of modifying the direction of travel of said wheels to increase the directional stability of the vehicle under a force tending to produce said tilting movement.

16. A vehicle comprising a sprung mass, a pair of wheel-supporting arms, wheels mounted thereon, a shaft extending transversely of the vehicle at a position spaced longitudinally of the vehicle from the axes of said wheels, said shaft being rigidly connected to said arms whereby a vertical swinging movement of one arm compels a similar swinging movement of the other arm, and springing means for cushioning relative bodily vertical and also relative tilting movement of said wheels and the sprung mass, said means including at least one body of resilient rubber-like material connected to said shaft to cushion rotative movement thereof by torsional stress in said body.

ALVIN S. KROTZ.

CERTIFICATE OF CORRECTION.

Patent No. 2,177,893.   October 31, 1939.

ALVIN S. KROTZ.

It is hereby certified that error appears in the printed specification of the above numbered patent requiring correction as follows: Page 4, first column, lines 18 and 29, claims 2 and 3 respectively, for the word "such" read each; and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.

16. A vehicle comprising a sprung mass, a pair of wheel-supporting arms, wheels mounted thereon, a shaft extending transversely of the vehicle at a position spaced longitudinally of the vehicle from the axes of said wheels, said shaft being rigidly connected to said arms whereby a vertical swinging movement of one arm compels a similar swinging movement of the other arm, and springing means for cushioning relative bodily vertical and also relative tilting movement of said wheels and the sprung mass, said means including at least one body of resilient rubber-like material connected to said shaft to cushion rotative movement thereof by torsional stress in said body.

ALVIN S. KROTZ.

CERTIFICATE OF CORRECTION.

Patent No. 2,177,893.  October 31, 1939.

ALVIN S. KROTZ.

It is hereby certified that error appears in the printed specification of the above numbered patent requiring correction as follows: Page 4, first column, lines 18 and 29, claims 2 and 3 respectively, for the word "such" read each; and that the said Letters Patent should be read with this correction therein that the same may conform to the record of the case in the Patent Office.

Signed and sealed this 16th day of January, A. D. 1940.

Henry Van Arsdale,
Acting Commissioner of Patents.

(Seal)